United States Patent Office 3,431,887
Patented Mar. 11, 1969

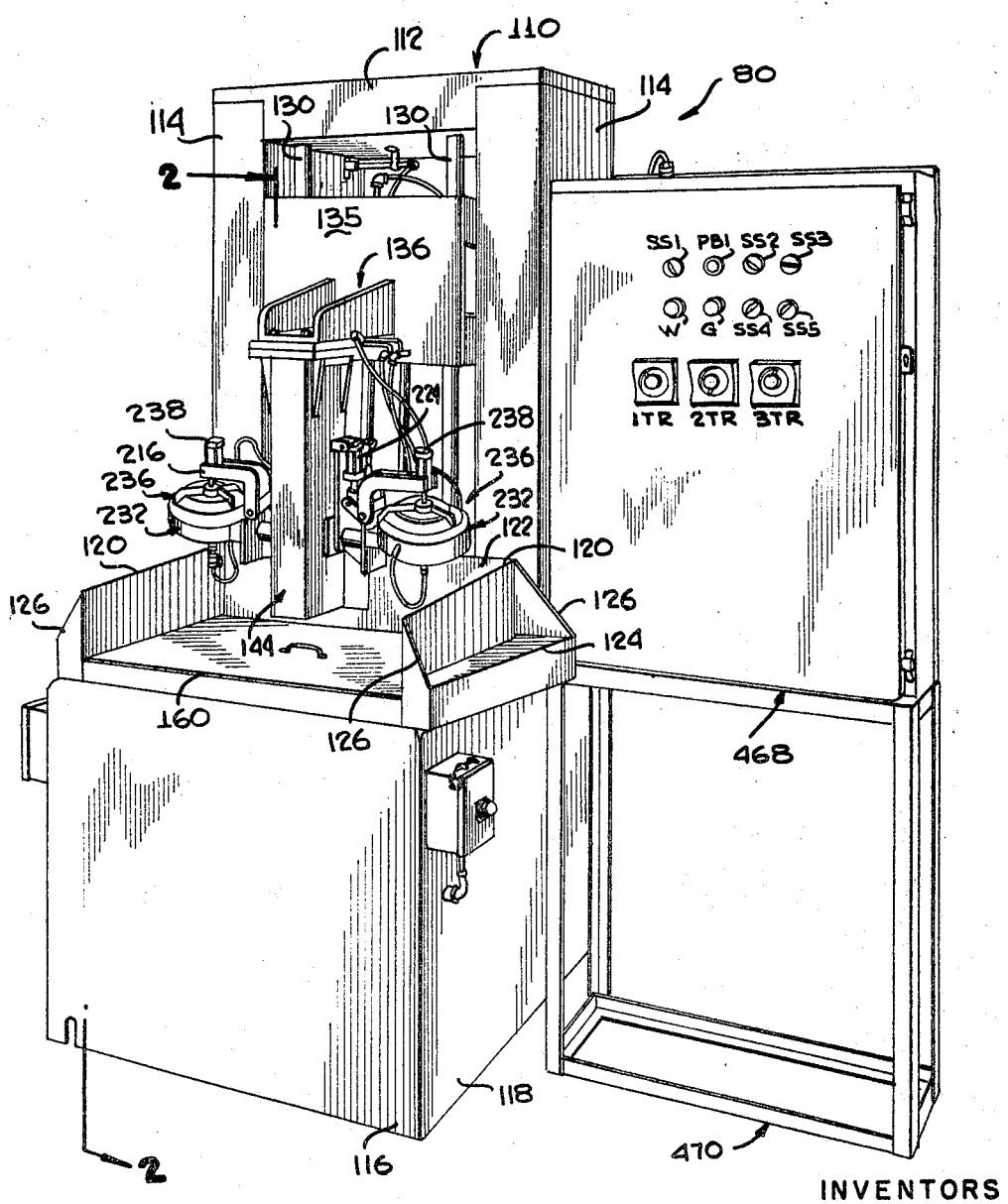

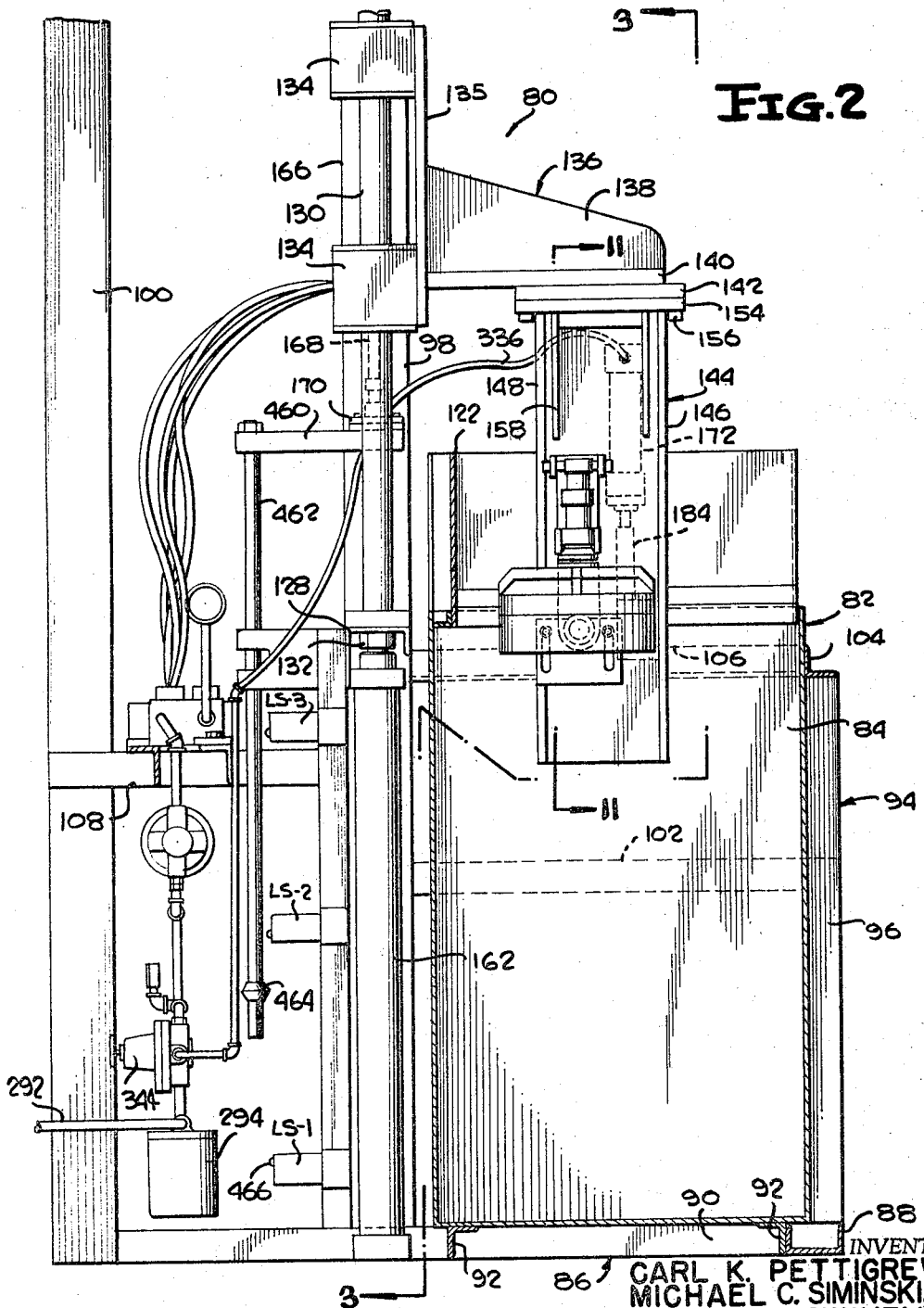

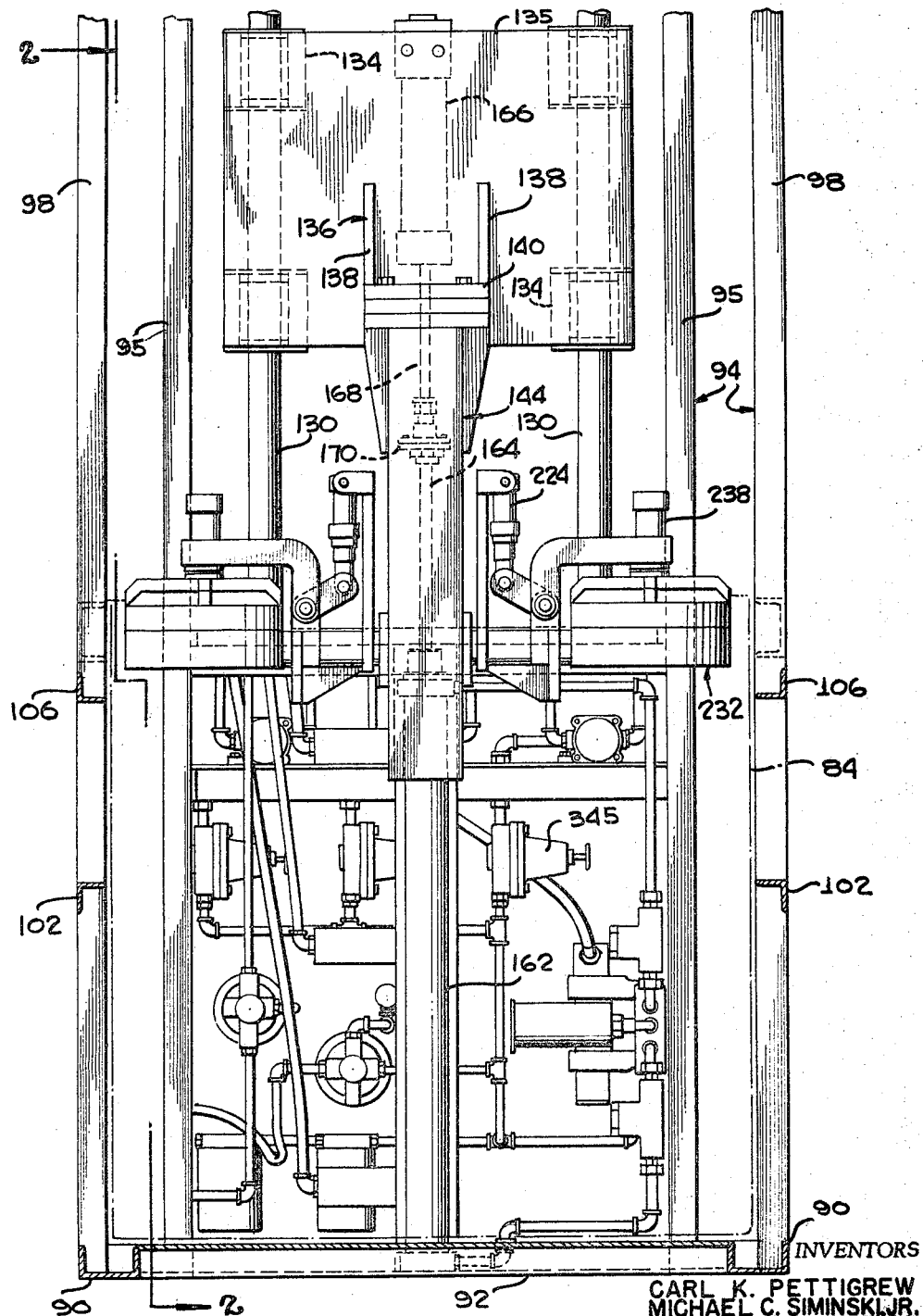

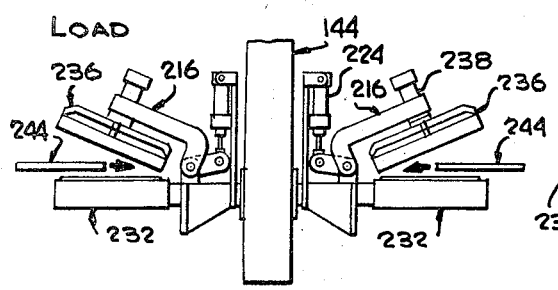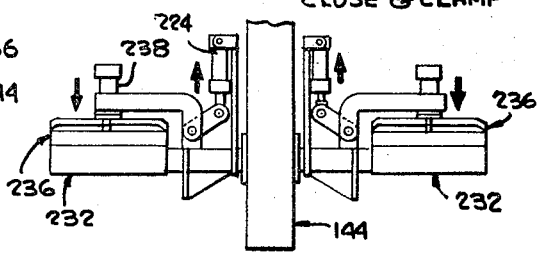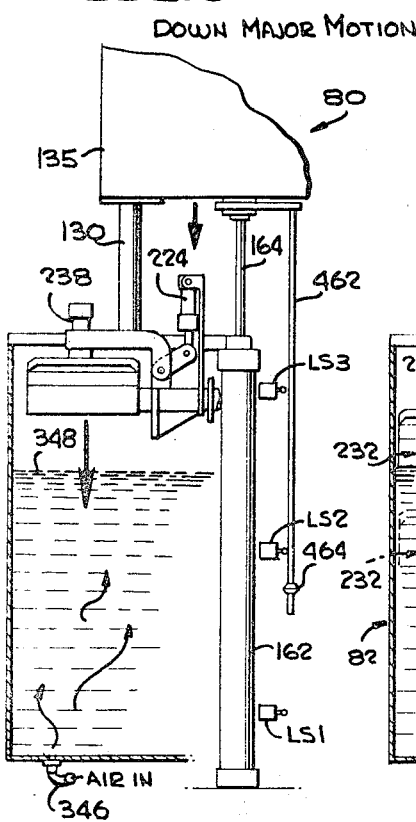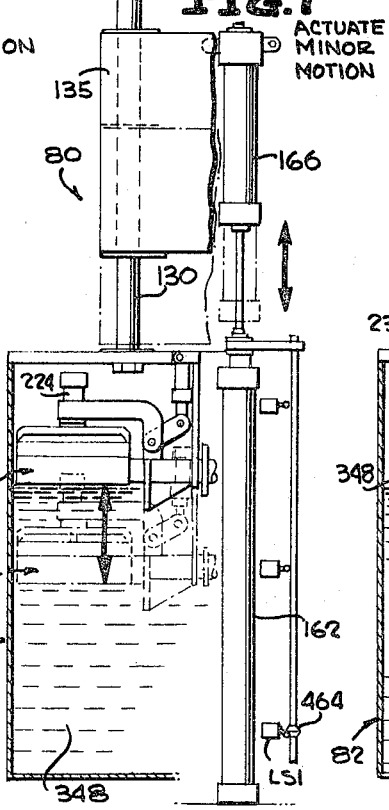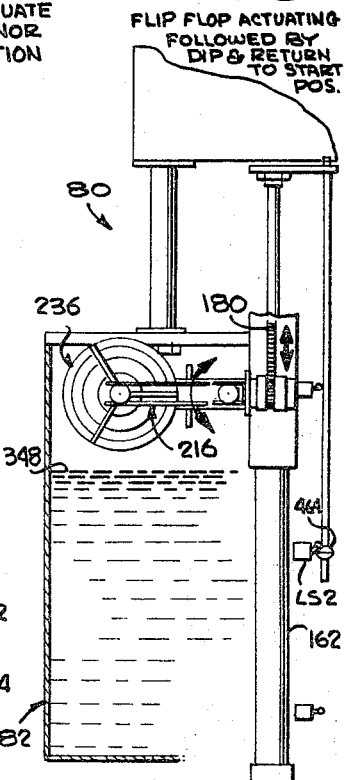

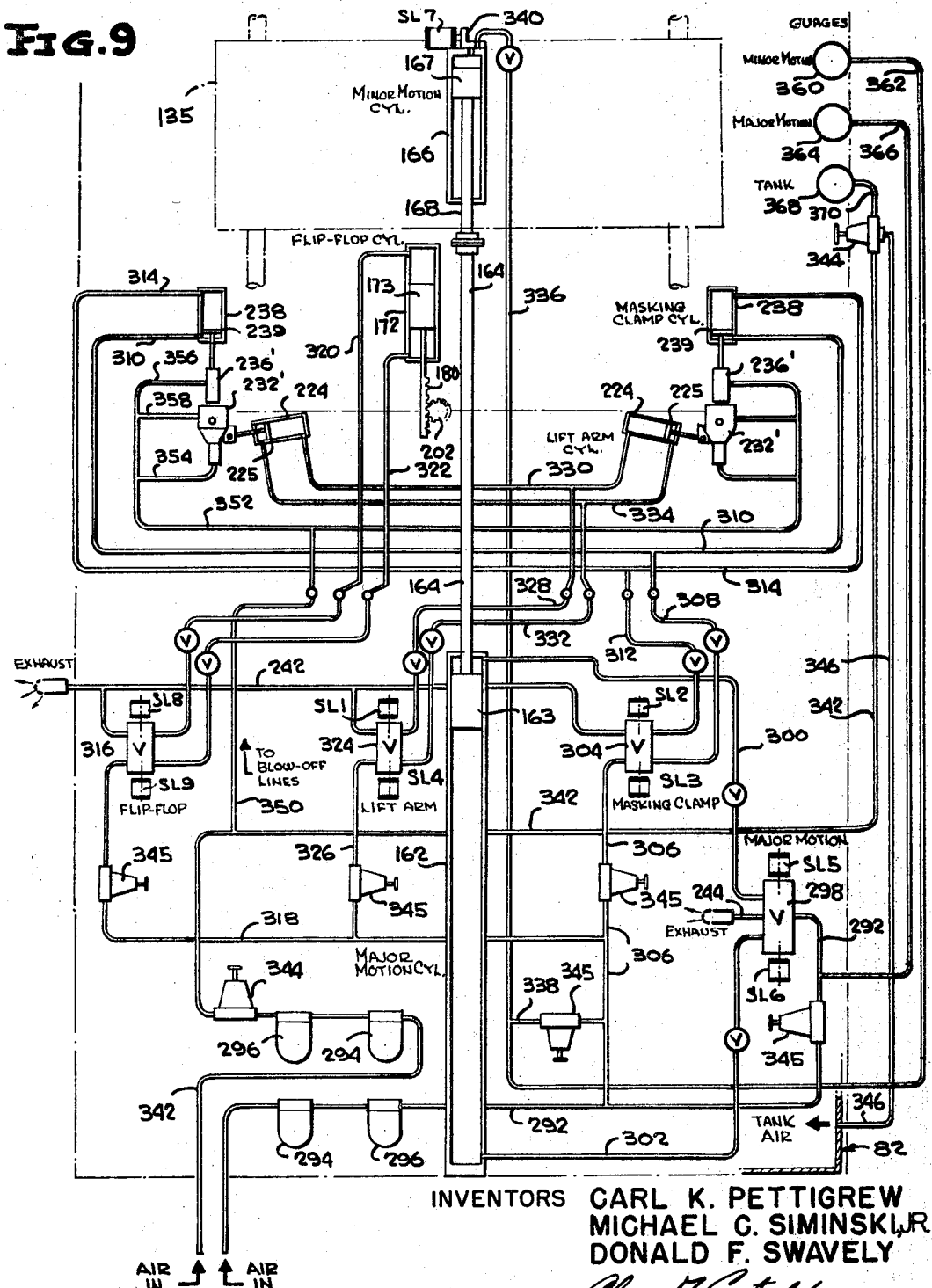

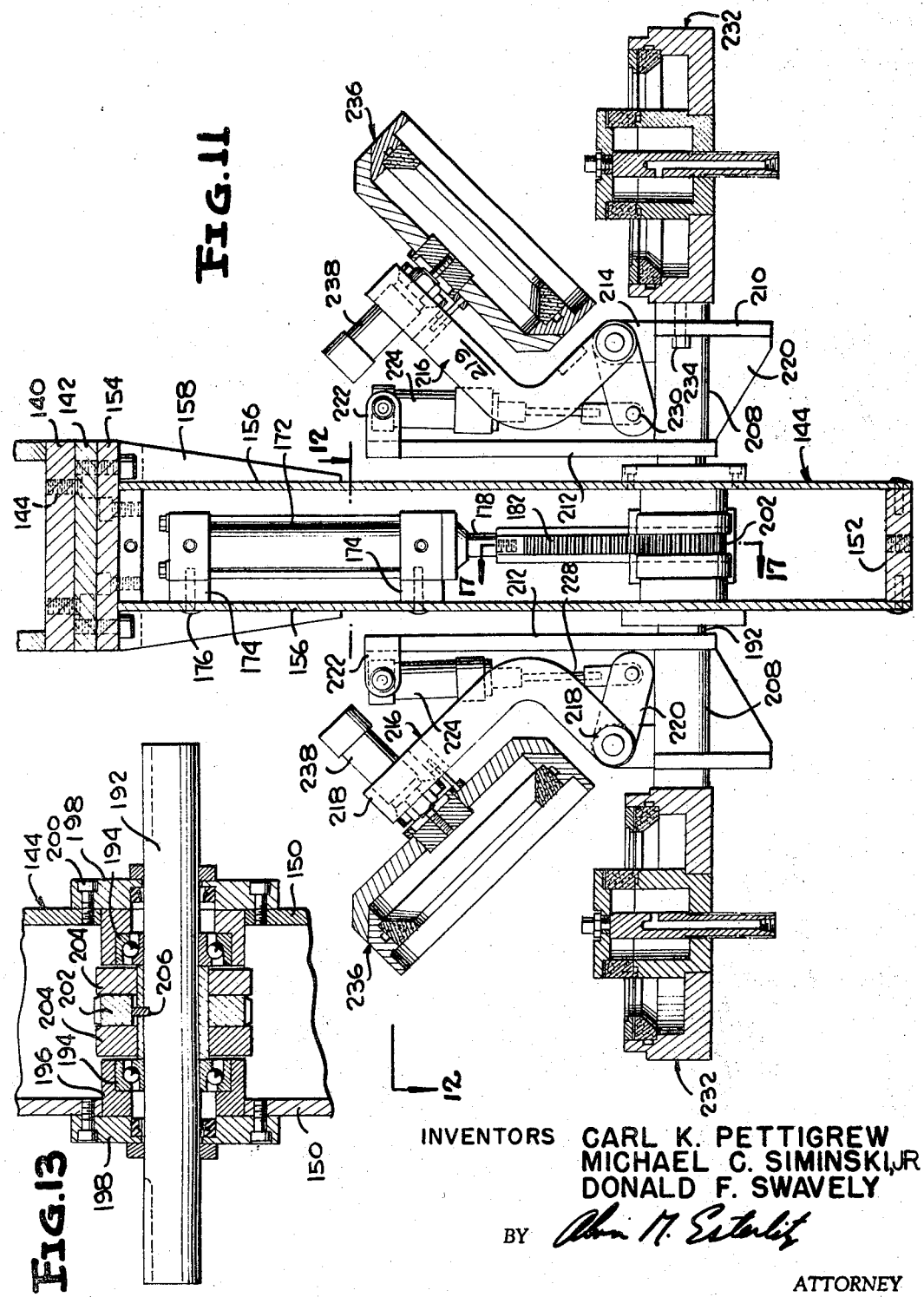

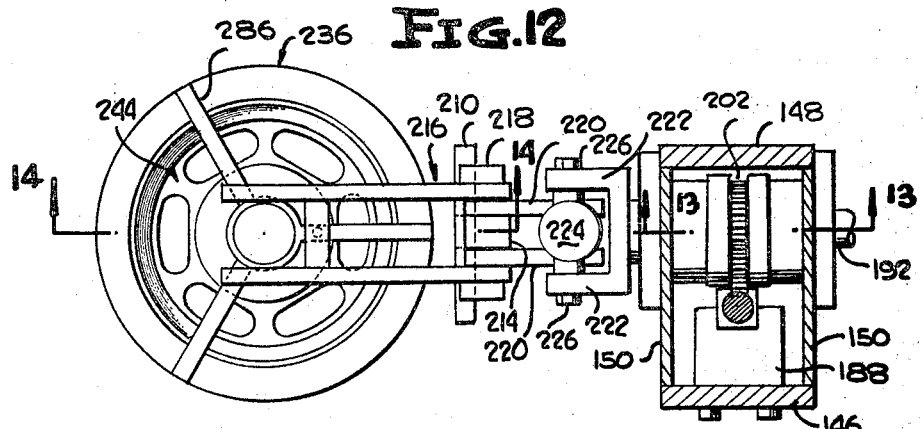
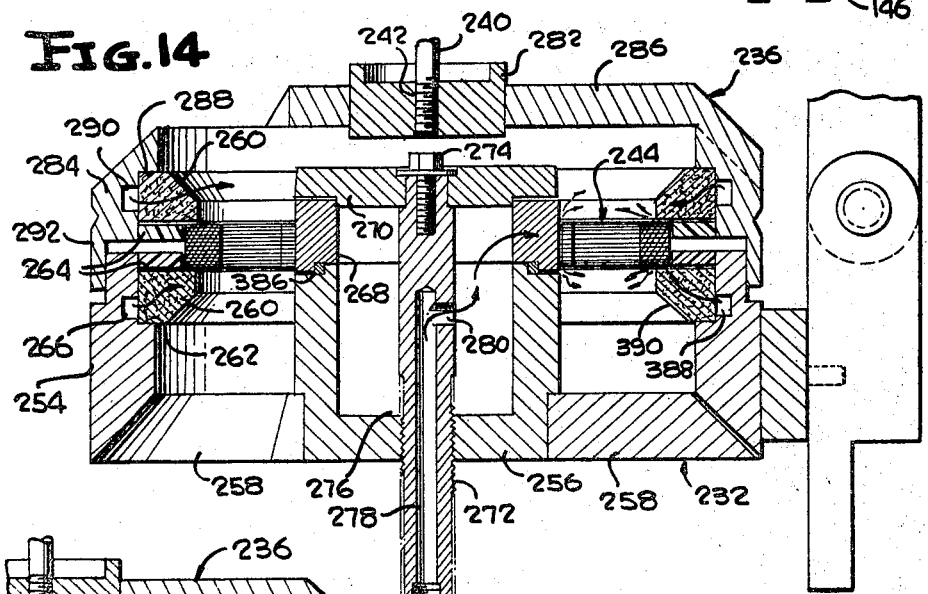
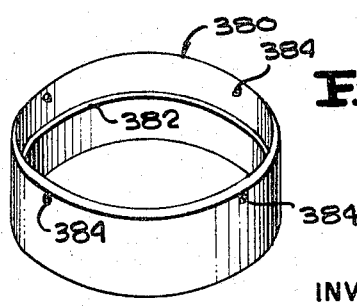
INVENTORS
CARL K. PETTIGREW
MICHAEL C. SIMINSKI, JR.
DONALD F. SWAVELY
ATTORNEY

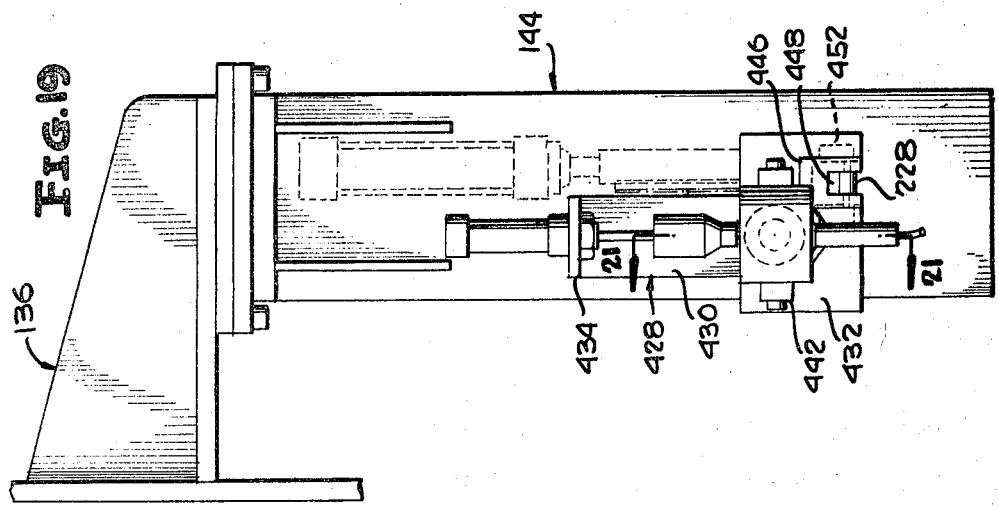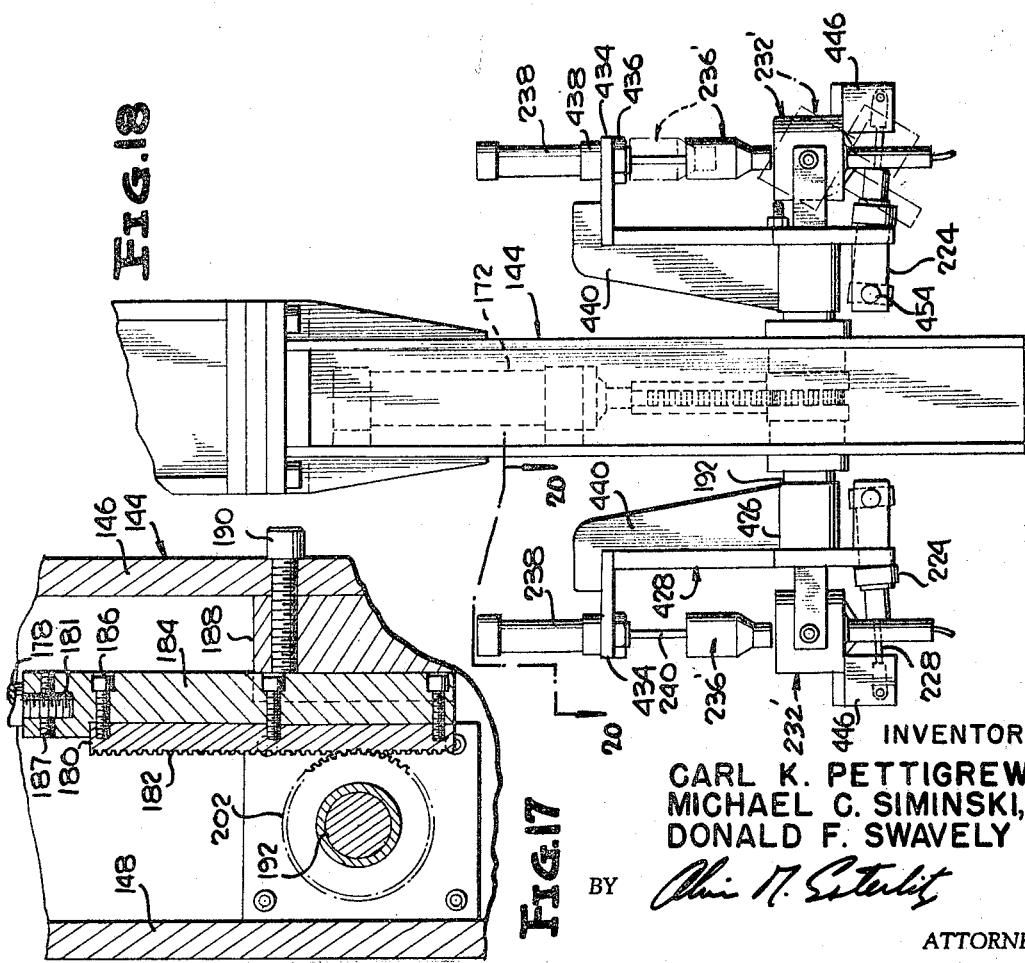

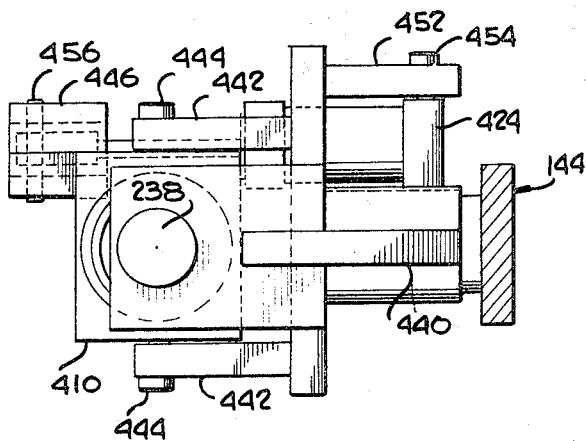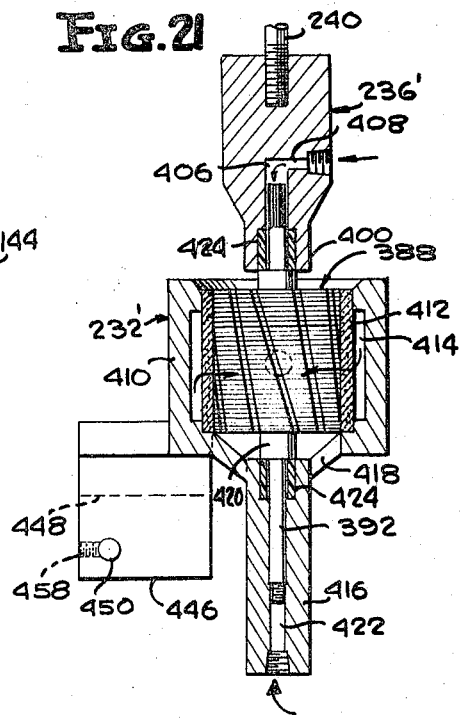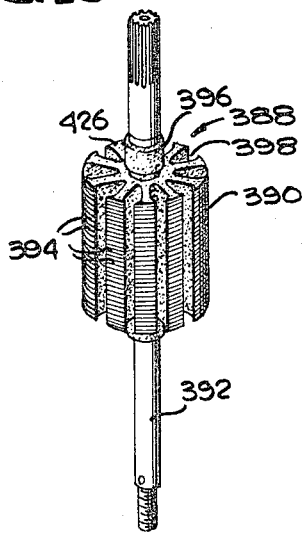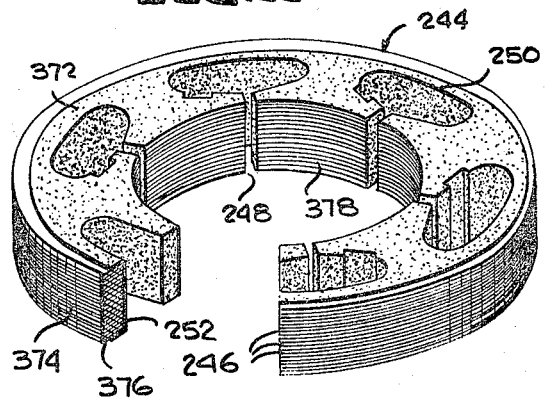

3,431,887
APPARATUS FOR COATING ARTICLES IN A FLUIDIZED BED
Carl K. Pettigrew, Rolling Hills, Reading, Michael C. Siminski, Jr., Sinking Spring, and Donald F. Swavely, Kenhorst, Reading, Pa., assignors, by mesne assignments, to The Polymer Corporation, a corporation of Pennsylvania
Filed Nov. 13, 1963, Ser. No. 323,444
U.S. Cl. 118—11                  9 Claims
Int. Cl. B05c *11/11, 11/12, 3/02*

ABSTRACT OF THE DISCLOSURE

Apparatus for masking and coating articles in a fluidized bed which includes means for immersing articles in the bed, means for causing a minor motion of the articles while immersed and means for rotating the articles after removal from the bed to remove excess coating.

---

This invention relates to coating devices, and more particularly to apparatus for automatically applying a coating of insulating material having a predetermined thickness to articles of various shapes and sizes, particularly articles comprising parts of electrical devices such as motors.

Briefly, the coating apparatus of this invention includes a fluidized bed and means for automatically dipping articles to be coated into the bed and removing the articles therefrom. The fluidized bed includes a tank containing a quantity of finely powdered material such as epoxy resin, and an inert gas such as air is bubbled or passed upwardly through the powdered material. The upward passage of the gas through the powdered material causes it to act and appear as a fluid, and thus articles may be dipped into the fluidized powder and coated thereby. Before the article is dipped into the fluidized bed, it is placed in a masking device which prevents the fluidized powder from coming into contact with certain predetermined surfaces of the article. The article is heated to a predetermined temperature before it is placed in the masking device. Automatic means then move the masking device with the article to be coated downwardly into the fluidized bed of powder whereupon the powder comes into contact with the unmasked surfaces of the article and are fused thereto by the heat of the article. The article and masking device are automatically reciprocated up and down within the fluidized bed a predetermined length of time to ensure that the unmasked surfaces of the article are thoroughly coated with fluidized powder. The article and masking device are then automatically raised out of the fluidized bed, flipped or rotated 180° on a horizontal axis and then moved downwardly again into the fluidized bed. During the second dipping operation with the article in the inverted position, the article and its masking device are again reciprocated up and down through a minor motion within the fluidized bed so as to bring additional powder into contact with the unmasked surfaces of the article. By dipping the article in both an upright and an inverted position into the fluidized powder, the article is thoroughly coated and a coating of more uniform thickness is provided. The article is then raised automatically out of the fluidized bed whereupon it is flip-flopped or oscillated a predetermined number of times so as to remove the excess powder therefrom. The coating machine then automatically releases or unclamps the article and cuts itself off. Preferably, the article is then removed from the coating apparatus and placed in a heated oven so as to thoroughly fuse and cure the resinous coating thereon. The coating apparatus performs the above described cycle of operation automatically, however, manual controls are provided for selectively eliminating certain portions of the cycle. For example, these controls permit the cycle to be reduced to one dipping operation if desired. The coating apparatus comprising this invention is particularly adapted for applying insulating coatings to components of dynamo electric machines, however, it may be used equally as well for coating other articles. Preferably, the coating material consists of powdered plastic or resin such as epoxy resin, nylon and polyethylene, however, other powdered materials may be used, such as powdered metals, glass and ceramics which are heat-fusible substances.

Advantages of using this invention for applying insulating coatings to the stators and rotors of electric motors and generators are:

(1) Elimination of conventional slot liners and end caps required by conventional insulating methods allow more windings in less space with a consequent significant reduction in winding metal needed.

(2) Changeover time for insulating one motor design to the next is greatly reduced over conventional slot-liner equipment. Newly designed equipment can accommodate a variety of stack heights, diameters, or slot configurations, often with the same tooling. Even grossly different motor styles can be insulated with the same equipment, requiring only a short downtime for changeover.

(3) Since fluid bed coating is integral to the motor laminations, there is no air space between the insulation and the laminations, as sometimes occurs with slot-liners. Motors can be designed to optimize the placement of copper and iron.

(4) Slot liner inventories and end cap inventories can be eliminated, as varying motor designs can be coated with the same fluid bed powder.

(5) Rejection rates caused by the seasonal effect of temperature and humidity on conventional slot lining materials are eliminated along with accompanying winding problems.

(6) Uniformity of coating is a process characteristic obtained even on sharp corners and edges of laminations, and on complicated shapes.

It is a primary object of this invention to provide an improved apparatus employing the fluidized bed process for applying a coating on the surface of a solid article.

It is another object of this invention to provide an apparatus for supporting an article and masking a portion of its surface while effecting the coating of the unmasked portion of the surface by fusion coating processes.

It is another object of this invention to provide a novel means for effecting the coating of a portion of a body by fusion coating processes.

It is another object of this invention to provide a novel means for effecting the coating of a portion of a body by fusion coating processes while maintaining other portions of the body free of such coating without the necessity of applying any type of device to the body or otherwise performing a physical operation thereon to accomplish the designed masking.

It is another object of this invention to provide improved holding and masking devices whereby objects can be coated by fusion coating processes without developing unequal coatings at the point of contact between the devices and the articles being coated.

It is still another object of this invention to provide a device for coating articles by a fluidized bed process which will apply a more thorough and uniform coating than previously known devices.

It is yet another object of this invention to provide a device which will automatically clamp and mask an article to be coated, dip the article in a fluidized bed, move the article about while submerged in the fluidized bed, withdraw the article from the fluidized bed, flip the article to an inverted position, again submerge the article in the fluidized bed, again move the article about while submerged in the fluidized bed, withdraw the article from the fluidized bed, move the article so as to remove excess coating material therefrom, and unclamp and unmask the article for easy removal from the coating apparatus.

It is yet another object of this invention to provide a device for coaing articles by subjecting them to a predetermined coating cycle, yet the device is provided with means for selectively eliminating or modifying portions of the coating cycle.

The invention will be best understood from a consideration of the following detailed description taken in connection with the accompanying drawings, wherein:

FIGURE 1 is a perspective view of a preferred form of the invention;

FIGURE 2 is an enlarged vertical cross sectional view taken substantially on the plane of lines 2—2 of FIGURES 1 and 3;

FIGURE 3 is a vertical cross sectional view taken substantially on the plane of lines 3—3 of FIGURES 2;

FIGURES 4 and 5 are front elevational views of the article clamping and masking means;

FIGURES 6, 7 and 8 are side elevational views of the invention with portions broken away and showing various components of the invention in different positions;

FIGURE 9 is a diagrammatic view illustrating the hydraulic system of the invention;

FIGURE 11 is an enlarged vertical cross sectional view through the masking and clamping component of the invention in the open position;

FIGURE 12 is a horizontal cross sectional view taken substantially on the plane of line 20—20 of FIGURE 18;

FIGURE 13 is an enlarged vertical cross sectional view taken substantially on the plane of lines 13—13 of FIGURE 12;

FIGURE 14 is an enlarged vertical cross sectional view taken substantially on the plane of line 14—14 of FIGURE 12;

FIGURE 15 is a perspective view of an adapter ring;

FIGURE 16 is a view similar to FIGURE 14 but showing the adapter ring of FIGURE 15 in use;

FIGURE 17 is a vertical cross sectional view taken substantially on the plane of line 17—17 of FIGURE 11;

FIGURE 18 is a front elevational view showing a modified form of clamping and masking device;

FIGURE 19 is a side elevational view of FIGURE 18;

FIGURE 20 is a horizontal cross sectional view taken substantially on the plane of line 20—20 of FIGURE 18;

FIGURE 21 is a vertical cross sectional view taken substantially on the plane of line 21—21 of FIGURE 19;

FIGURE 22 is a perspective view with portions broken away showing the stator of a dynamo electric machine after it has been coated with the apparatus of this invention;

FIGURE 23 is a perspective view of a rotor of a dynamo electric machine after it has been coated with the apparatus of this invention.

Figure 10:
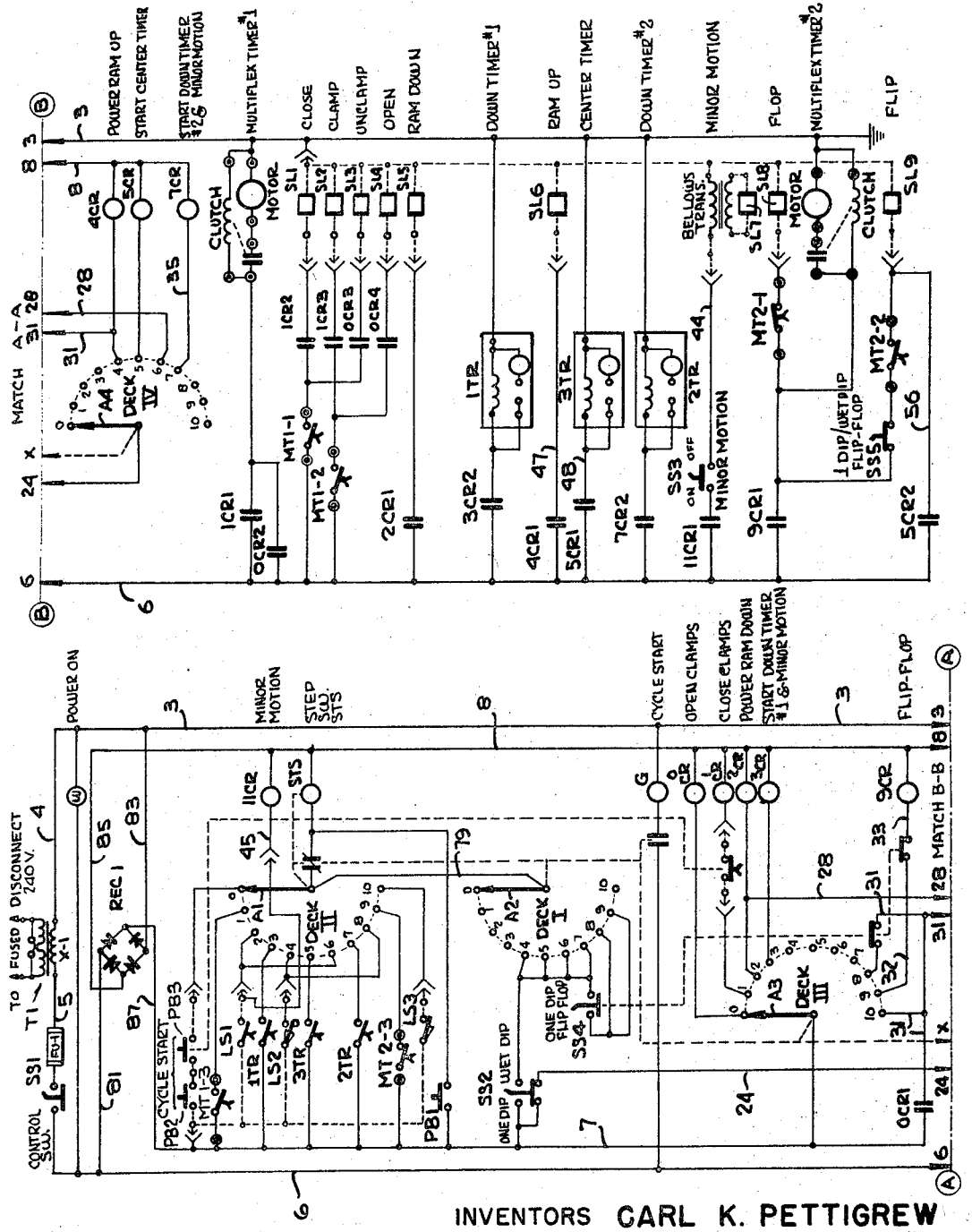
FIGURE 10 is a diagrammatic view illustrating the electrical system of the invention.

As illustrated in the drawings, and particularly FIGURES 1 through 3, the coating apparatus 80 includes a box shaped fluidizing bed tank 82 having and enclosing a chamber 84 of rectangular cross section. The top of the tank 82 is open and the bottom thereof is supported on a rectangular base 86 comprising a front channel 88 connected at its ends to side channels 90. Base 86 also includes cross braces 92 extending between the side channels 90 and supporting the bottom of tank 82.

The base 86 is connected to and comprises the bottom of a frame 94 which includes vertically extending spaced posts 96, 98 and 100 secured together by horizontally extending braces 102, 104, 106 and 108. The posts 100 at the rear of the frame extend a substantial distance above the tank 82 and are enclosed by rectangular housing 110 which includes a top 112 extending across and connected to the tops of the posts 100, and the housing 110 also includes parallel side panels 114. As shown in FIGURE 1, the front of the frame and the tank 82 may be enclosed by rectangular panels 116 and 118.

The side and rear upper edges of the tank 82 are connected by suitable means to vertical baffle plates 120 and 122 as shown in FIGURES 1 and 2. Horizontal shelves 124 are connected to the outer sides of the baffle plates 120 by means of brackets 126.

A channel shaped beam 128 extends between and is connected to the central portions of the vertical posts 98. A pair of parallel spaced vertically extending bearing shafts 130 extend between the beam 128 and top 112, and are connected thereto by suitable means, such as nuts 132 threaded on the ends of the shafts which extend through bores in the beam and top.

A pair of anti-friction bearings 134 are slidably mounted on each of the bearing shafts 130 and are connected to a head support plate 135. A bracket 136 comprising parallel substantially triangular plates 138 and a horizontal plate 140 is welded to the front surface of head support plate 135, and as shown in FIGURES 1 and 11 has an intermediate plate 142 removably secured thereto as by studs 144.

A hollow box shaped head 144 comprising front and rear plates 146 and 148, side plates 150, bottom plate 152 and top plate 154 is removably secured to intermediate plate 142 by means of studs 156. Gussets 158 are secured between plates 150 and top plate 154 as shown in FIGURE 11.

The top of tank 82 is normally covered by a removable cover of rectangular shape as illustrated in FIGURE 1.

As illustrated in FIGURE 3, frame 94 also includes inner vertical posts 95 in alignment with the post 98 and extending between base 86 and top 112. Beam 128 extends between the posts 95. A major fluid pressure cylinder 162 is connected to and extends vertically between beam 128 and base 86 as illustrated in FIGURES 2 and 3. As shown in FIGURE 9, conventional fluid pressure piston 163 is slidably mounted within cylinder 162 and secured to a vertically extending piston rod 164 which extends outwardly and upwardly through a seal in the upper end of cylinder 162.

As shown in FIGURES 3 and 9, a minor fluid pressure cylinder 166 is secured to the back face of plate 135 in axial alignment with cylinder 162 and has slidably mounted therein a piston 167 secured to a piston rod 168 which extends through a seal in the lower end of cylinder 166, and the rod 168 is removably connected to the rod 164 by a rod coupling 170.

As shown in FIGURES 9 and 11, a cylinder 172 of a flip-flop motor is contained within a head 144 and secured to a side plate 150 thereof by means of spacer blocks 174 and studs 176. A conventional piston 173 is slidably mounted within cylinder 172 and connected to a rod 178 which extends downwardly through a seal in the lower end of cylinder 172. A ratchet plate 180 including a plurality of teeth 182 is removably secured to a bar 184 by means of a plurality of studs 186. Bar 184 is removably secured to rod 178 by means of a threaded extension 180 of the rod being threaded into a recess within bar 184. Set screws 187 lock the bar 184 to the extension. A bearing block 188 is removably secured to the front plate 146 of head 144 by means of studs 190, and is provided with a groove which slidably receives the bar 184.

As shown in FIGURES 11, 12 and 13, a horizontal shaft 192 extends through aligned bores in plates 150 of head 144 and is rotatably journaled to the head by means of roller bearings 194 which are secured to head 144 by means of bushings 196 fixed to plates 198 which are secured removably to plates 150 by means of studs 200. The gear 202 is fixed to shaft 192 and spaced from bearings 194 by means of washers 204. Gear 202 may be fixed to shaft 192 by means of a spline 206.

As shown in FIGURES 11 and 12, a sleeve 208 is fixed on each end of shaft 192. A mounting plate 210 and a support arm 212 is fixed to the outer and inner end respectively of each sleeve, and a radially extending ear 214 is also fixed to the outer end of each sleeve so as to project upwardly therefrom. A pair of bell crank levers, shown generally as 216, are pivotally connected to each ear by means of a pivot pin 218. Each bell crank lever includes an L-shaped arm 219 and a straight arm 220. Each mounting plate 210 extends downwardly from its respective sleeve 208 and is further connected to the sleeve by a gusset 220.

A pair of spaced ears 222 are fixed to the upper end of each support arm 212 and the upper end of a closing fluid pressure cylinder 224 extends between each pair of ears 222. Each cylinder 224 is pivotally connected to each pair of ears 222 by means of a pair of bolts 226 which extend through bores in the ears and are threaded into the upper end of the cylinder. Each cylinder 224 contains a fluid pressure operated piston slidable therein which is connected to a piston rod 228 extending through a seal in the lower end of each cylinder. The lower end of each piston rod 228 extends between a pair of arms 220 and is pivotally connected thereto by a pivot pin 230.

Holding means for holding an article to be coated are mounted on the outer ends of shaft 192. As shown in FIGURES 11 and 12, the holding means may comprise a pair of lower masks 232 removably secured to the plates 210 as by bolts 234 and a pair of upper masks 236 mounted on the outer ends of bell crank levers 216. A fluid pressure operated clamping cylinder 238 is fixedly mounted between the outer ends of each pair of adjacent bell crank levers 216 and contains a conventional fluid pressure operated piston slidably mounted therein which is connected to a piston rod 240 which extends through a seal in the lower end of the cylinder. As shown in FIGURE 14, the lower end of each rod 240 is detachably connected to an upper mask 236 by means of a threaded connection 242.

The masks 232 and 236 are particularly adapted to clamp and hold a conventional stator 244 of a dynamo electric machine or device illustrated in FIGURE 22. Stator 244 as illustrated includes a stack of annular discs 246 having a plurality of slots 248 and openings 250 formed therethrough. Openings 250 are designed for receiving a plurality of thinly insulated conductive wires, and to prevent the insulation on the conductive wires from being damaged by the relatively sharp edges of openings 250 and slots 248, and to further insulate the wires from the discs 246, it is desirable that an insulating coating such as illustrated at 252 be applied to the stator so as to cover the surfaces defining the openings 252 and slots 248 as well as portions of the ends of the stator. Coating apparatus 80 is designed for automatically applying an insulating coating such as 252 to each of a plurality of articles in rapid succession. FIGURE 14 illustrates the stator 244 clamped by the upper and lower masks 232 and 236.

As illustrated in FIGURES 11 and 14, each lower mask 232 is substantially cup shaped and includes an anunlar wall 254 secured to a cup shaped hub 256 by a plurality of radially extending spaced arms 258. An annular ring 260 is fixedly mounted within an annular recess 262 of wall 254 so as to project radially inwardly from the inner surface thereof, and the radially outer portion of the upper surface of ring 260 is covered by washer 264 fixed to the ring. An annular groove 266 is formed in a surface of recess 262 and constitutes a passage for compressed gas. When compressed gas is admitted to passage 266, it flows through ring 260 since this ring is composed of a porous material which permits the passage of gas therethrough. Ring 264 and wall 254 are composed of material impervious to the flow of gas therethrough. An inner ring 268 is fixed to the upper edge of hub 256 so as to form an extension thereof and is also composed of a porous material similar to the material comprising ring 260. A circular cover 270 extends over the upper edge of ring 268 and is secured to a threaded stud 272 by means of a nut 274. Stud 272 is threaded through the center of hub 256 so as to securely clamp ring 268 to the hub and form a gas chamber 276. Stud 272 is provided with a central passage 278 connected to chamber 276 by means of a radial port 280.

The upper mask 236 includes a circular central hub 282 secured to an annular wall 284 by means of a plurality of spaced radial arms. Wall 284 also is formed with an annular recess 288 containing a porous ring 260 and having a groove 290 formed in one surface thereof comprising a passage for compressed gas. A washer 264 is also secured to a surface of ring 260. Wall 284 also includes an annular flange 292 which overlaps a recessed portion of wall 254 as shown in FIGURE 14 when the masks are mated.

As illustrated diagrammatically in FIGURE 9, the various fluid pressure cylinders of the coating apparatus 80 are selectively supplied at each of their opposite ends with fluid pressure by means of a main supply conduit 292 connected to a suitable source of fluid pressure, preferably gas under pressure. Conduit 292 is connected in series with an air or gas filter 292 which is particularly designed for removing moisture and other foreign material from the gas flowing therethrough, and is also connected in series with a lubricator 296 for supplying a lubricant to the gas flowing therethrough. Conduit 292 terminates at a major motion valve 298 which in turn is connected to opposite ends of the major motion cylinder 162 by conduits 300 and 302 and is selectively operated by a pair of solenoids SL5 and SL6.

The main line 292 is connected to a masking clamp control valve 304 by conduit 306, and the valve 304 is connected to opposite ends of masking clamp cylinders 238 by conduits 308, 310, 312 and 314. Masking clamp valve 304 is operated so as to selectively apply fluid pressure to either end of each cylinder 238 by means of solenoids SL2 and SL3.

A flip-flop control valve 316 is connected to main conduit 292 by conduit 318 and a portion of conduit 306. Valve 316 is selectively operated by a pair of solenoids SL8 and SL9 so as to selectively connect conduit 318 to opposite ends of the flip-flop cylinder 172 by means of conduits 320 and 322.

A lift arm control valve 324 is connected to the main conduit 292 by a conduit 326 and portions of conduits 318 and 306. Valve 324 is selectively operated by a pair of solenoids SL1 and SL4 so as to selectively connect opposite ends of the closing or lift arm cylinders 224 to conduit 326 by means of conduits 328, 330, 332 and 334.

The main conduit 292 is connected to the minor motion cylinder 166 by means of conduits 336 and 338 and a portion of 306. Conduit 236 is connected to the minor motion cylinder 166 by means of a valve 340 which is operated by solenoid SL7. It is to be noted that the cylinder 166, solenoid SL7 and valve 240 comprise a conventional motor model BCAME manufactured by the Bellows Company. This motor includes means for applying fluid pressure alternately to opposite ends of cylinder 166. When solenoid SL7 is energized, fluid pressure is automatically alternately admitted to and exhausted from opposite ends of cylinder 166 so as to cause this cylinder and head support plate 135 attached thereto to reciprocate up and down relative to piston rods 168 and 164.

It is to be noted that valves 316, 324, 304 and 298 are connected to exhaust conduits 242 and 244. Each of these valves is operated by a pair of solenoids. When one of these solenoids is energized, the valve is actuated so as to admit fluid pressure to one end of a cylinder and exhaust the other end of the cylinder, and when the other solenoid is energized, the motor is operated in the reverse direction since the one end thereof is exhausted and the other end thereof is connected to the source of fluid pressure. For example, when solenoid SL5 is energized, fluid pressure is admitted to the upper end of cylinder 162 while the lower end of the cylinder is exhausted by conduits 302 and 244 so that piston rod 164 is forced downwardly. On the other hand, when solenoid SL6 is energized, fluid pressure is supplied to the lower end of cylinder 162 by conduits 302 and 292 and the upper end of the cylinder is exhausted by conduits 300 and 244. When neither of the solenoids are energized, the valve seals the ends of conduits 300, 302 and 292 which are connected to the valve.

Tank 82 is connected to a suitable source of compressed gas, preferably air, by means of a main conduit 342 which includes in series therewith an air filter 294, a lubricator 296 and a cut off valve 344, and the end of main conduit 342 is connected to tank 82 by another cut off valve 344 and conduit 346. Normally tank 82 contains a quantity of heat fusible resinous powder 348 as illustrated in FIGURE 6 such as epoxy resin, nylon, polyethylene, etc. As compressed air is exhausted from conduit 346 into the bottom of tank 82, the air passes upwardly first through a porous partition plate (not shown) and then through the powder thereby causing it to become fluidized. The porous partition plate, which may be porous ceramic, porous sintered alumina, etc., is ordinarily disposed in the lower part of the tank. The porous plate supports the powder above, provides a plenum chamber below and distributes the fluidizing air through the powder, all in known fashion; see, for example, col. 5, and FIGURE 1 of U.S. Patent 2,844,489.

The masks such as 232 and 236 illustrated in detail in FIGURE 14 are connected to the main conduit 242 by conduits 350, 352, 354, 356 and 358 as illustrated in FIGURE 9. When the masks 232 and 236 illustrated in FIGURE 14 are used, conduit 354 is connected to passage 278, conduit 358 is connected to passageway 266 and conduit 356 is connected to passage 290.

As illustrated in FIGURE 9, each of the control valves 316, 324, 304, 298 and 340 are connected to the main pressure line 292 by means of pressure regulating valves 345 which are similar to the valves 344 which also may function as pressure regulator valves.

A minor motion pressure gauge 360 is connected to the minor motion cylinder conduit 336 by conduit 362, a major motion pressure gauge 364 is connected to the main conduit 292 by conduit 366, and a tank pressure gauge 368 is connected to tank conduit 346 by conduit 370 and a valve 344.

When the apparatus 80 is not in use, the masks 232 and 236 are held apart in the open position by cylinders 224 and 236 as illustrated in FIGURE 11. To coat an article, such as the stator 244 in FIGURE 22, the stator is placed within the mask 232 so that its bottom surface is supported on the porous ring 260 and the mask 236 is moved downwardly by cylinders 238 and 224 so as to mate with the lower mask 232 as illustrated in FIGURE 14. Since air pressure is supplied to chamber 276, groove 266 and groove 290 by means previously described, this air pressure flows through the porous rings 260 and 268 and exhausts upon the surfaces 372, 374, 376 and 378 (see FIGURE 22) of the stator 244, when the masks and article 244 are dipped into the fluidized resinous powder 348 within tank 82, the powder is prevented by the flow of air over these surfaces from coming in contact therewith. However, since the article has been previously heated above the melting temperature of the powder 348, the remaining surfaces of the stator come in contact with the powder thereby heating same and causing the powder to fuse to the unmasked surfaces.

FIGURE 15 illustrates an adapter ring 380 which may be used with the masks 232 and 236 so that the masks may be used for coating a stator such as stator 244' having a greater thickness than the stator 244. The ring 380 has an annular recess 382 formed therein which receives the flange 292 of the upper mask 236. Ring 380 is secured to flange 292 by means of set screws 384. The adapter ring as illustrated in FIGURE 16 functions as an extension of flange 292 thus permitting the masks 236 and 232 to be mated while spaced a greater distance apart thereby permitting them to properly mask the thicker stator 244'. When the ring 380 is used, the porous ring 268 must be replaced by ring 268' having a greater axial length. Ring 268 is preferably secured to hub 256 by removable means such as a gasket 386 press fitted between opposing flanges on hub 256 and ring 268 or 268'. To more effectively mask the article being coated, the annular surfaces 388 and 390 of rings 260 may be sealed with a nonporous coating.

The coating apparatus 80 may be also be used for applying an insulative coating to predetermined surfaces of a conventional rotor, such as the rotor 388 ilustrated in FIGURE 23 for a dynamo electric device. The rotor 388 includes a cylinder 390 concentrically mounted on a rotatable shaft or spindle 392. A cylinder 390 includes a plurality of annular discs 394 having spaced radial slots therein and stacked on a central sleeve 396. The discs 394 are secured to sleeve 396, which in turn is secured to the shaft 392, and the radial slots in the discs are axially aligned so as to provide a plurality of axially extending grooves 398 in the outer periphery of cylinder 390.

The masks 232' and 236' illustrated in FIGURES 18 through 21 are adapted for holding and masking rotor 388 so that when the masks and the rotor are dipped into a fluidized bed of powder, only the end surfaces of cylinder 390 and spindle 396 and the surfaces defining the slots 398 are exposed to and contacted by the powder. The mask 236' includes a cylindrical member having a reduced lower end 400 and a threaded recess in its upper end for receiving the threaded end of piston rod 240 as shown in FIGURE 21. The lower end of the mask 236' is provided with an axial bore 402 for loosely receiving one end of shaft 392. The upper end of bore 406 is connected to a radial passage 408 which is adapted to be connected to the conduit 356 of FIGURE 9 for supplying air pressure to bore 406.

The mask 232' comprises an annular sleeve 410 having an interior surface lined with a porous ring 412. An annular groove 414 formed in the inner surface of sleeve 410 is closed by the porous ring 412. A tubular extension 416 is connected to the lower end of sleeve 410 by means of a frusto conical wall 418 having slots 420 formed therethrough. The tubular extension 416 is provided with an axial bore 422 extending therethrough which is adapted to loosely receive the lower end of shaft 392. The adjacent ends of the bores 406 and 422 are preferably lined with Teflon bushings 424. As ilustrated in FIGURE 9, groove 414 and bore 422 are connected to a source of air pressure by means of conduits 358 and 354 respectively. When the assembly shown in FIGURE 1 is dipped into a bed of fluidized fusible powder, the air flowing from groove 414 through ring 412 blows over the outer peripheral surface of cylinder 390 and thereby prevents powder from contacting and fusing to this surface. The air pressure in the bores 406 and 422 forces air axially inwardly over the outer peripheral surfaces of the ends of shaft 392 thereby preventing powder from contacting these surfaces. However, powder flows freely through slots 420 and the upper end of sleeve 410 so as to thoroughly coat the ends of cylinder 390 and the surfaces defining grooves 398. Since the rotor is heated before it is dipped, the powder fuses to the exposed surfaces of the rotor to form a plastic or resinous insulating coating 426.

The means for mounting the masks 232' and 236' on the end of rotatable shaft 192 are illustrated in FIGURES 18 through 21 and include a sleeve 426 removably splined to each end of the shaft. A T-shaped plate 428 comprising a rectangular upper portion 430 and a rectangular lower portion 432 is secured to the outer end of each sleeve 426. A horizontally extending support plate 434 is fixed to the upper end of plate portion 430 and is formed with a bore through which extends the lower end of clamping cylinder 238. Cylinder 238 may be connected to support plate 434 by means of a nut 436 threaded on the lower end of the cylinder so as to clamp plate 434 between the nut and a flange 438. Bushing 426, plate 428 and plate 434 are further secured together and reinforced by a substantially L-shaped gusset 440 welded thereto.

A pair of parallel arms 442 are secured to the rectangular portion 432 of plate 428 and extend outwardly therefrom so as to straddle opposite sides of sleeve 410 which has a rectangular outside shape as shown in FIGURE 20. Sleeve 410 is pivotally connected to the free ends of arms 442 by a pair of pivot pins or studs 444 which may be threaded into the sleeve and journaled within bores in the ends of the arms.

A rectangular block 446 having a rectangular groove or recess 448 and a bore 450 formed in the lower portion thereof is welded to a lower corner of sleeve 410. A horizontal arm 452 is secured to a lower corner of plate portion 432 and is pivotally connected to an inner end of cylinder 224 by means of a pivot pin 454. Cylinder 224 extends outwardly through a notch formed in the bottom of the T-shaped plate 428 and its piston rod 228 extends into recess 448 where it is pivotally connected to block 446 by a pivot pin 456. Pin 456 extends through bore 450 in block 446 and is secured thereto by set screws 458.

As illustrated in FIGURE 2, an arm 460 is secured to the rod coupling 170 which secures the piston rods 168 and 164 together, and the arm extends rearwardly in a horizontal direction from the coupling. The rear end of the arm is fixed to the upper end of a vertical cam rod 462 which has secured to its lower end a cam ring 464. When cam 464 is moved up and down by piston rod 164, it is adapted to contact switch toggles 466 which are provided on each of the switches LS1, LS2 and LS3 so as to actuate these switches. The switches are secured to frame 94.

A control panel 468 is mounted on a suitable rectangular frame 470 which is fixed to the frame 94 as shown in FIGURE 2. The control panel contains electrical components for automatically controlling the coating apparatus 80 and which are shown diagrammatically in FIGURE 10.

The coating apparatus 80 is automatically controlled through a complete coating cycle by the electrical circuit indicated diagrammatically in FIGURE 10. The circuit includes an intricate system of timers, relays, solenoids and an eleven position stepping switch STS having decks I, II, III and IV. Each of the four decks includes a pivoted contact arm A1, A2, A3 and A4 respectively. The four contact arms are coupled together so as to rotate as a unit and each is adapted to contact terminals 0 through 10.

Line voltage of 240 volts AC is supplied to the primary coil of transformer T1. The voltage is reduced to 120 volts AC at the secondary coil of the transformer which is sufficient voltage to operate the various timers and solenoids of the circuit. The secondary coil X1 supplies 120 volts AC to two main AC lines 3 and 6 by conductors 4 and 5. Conductor 5 contains in series therewith a fuse FU1 and a control switch SS1. Main AC lines 3 and 6 are connected to a rectifier REC1 by conductors 81 and 83, and the rectifier is connected to main AC lines 7 and 8 by conductors 85 and 87 so as to supply 120 volts DC thereto. The 120 volts DC applied to the main lines 7 and 8 is suitable for operation of the various relays and the stepping switch of the circuit.

To use the coating apparatus 80, for coating an article such as the rotor 388 of FIGURE 23, a suitable quantity of heat-fusible powder is placed within tank 82 and valve 344 shown in FIGURE 9 is opened to supply a stream of air to the bottom of tank 82 by conduits 342 and 346. A flow of air is also applied to the masks 236' and 232' by conduits 350, 352, 354, 356 and 358. The rotor 388 which has been heated to a suitable temperature above the melting temperature of the powder 348 is then placed within mask 232'.

To start the machine, the master control switch SS1 is closed thereby supplying 120 volts AC to the main lines or conductors 3 and 6 which causes a white light W located on control panel 468 to become energized so as to indicate the main power supply is turned on. The push button switches PB2 and PB3 are then depressed thereby supplying 120 volts DC to the stepping coil of the stepping switch STS causing the switch to be stepped from its initial position 0 to position 1 and causing a green light G located on the control panel 468 to become energized indicating that the cycle has started. The stepping coil of the stepping switch is energized by deck II. At position 1, deck III of switch STS energizes relay 1CR which in turn closes relay switches 1CR1, 1CR2, and 1CR3. The closing of relay switch 1CR1 starts multiflex timer number one by connecting it to AC line 3 and 6. The starting of the multiflex timer 1 closes and opens switch MT1–1 thereby causing solenoid SL1 to be energized, and the timer also closes and opens switch MT1–2 causing solenoid SL2 to be energized. The energization of solenoid SL1 causes valve 324 to open so as to supply fluid pressure by lines 328 and 330 to the inner ends of closing cylinders 224 thereby causing the lower mask 232' to pivot from the dotted line position in FIGURE 18 to a vertical position as shown inside lines. The energization of solenoid SL2 operates valve 304 so as to supply fluid pressure by lines or conduits 312 and 314 to the upper ends of clamping cylinders 238 so as to force the upper mask 236' from the dotted line position of FIGURE 18 to the solid line position so that the upper end of spindle 392 is received within the bore 406 as shown in FIGURE 21, thereby fully clamping and masking the rotor 388 in each pair of masks. Multiflex timer No. 1 then closes switch MT1–3 thereby pulsing the stepping switch STS to position #2, thereby de-energizing relay 1CR which causes switches 1CR1, 1CR2 and 1CR3 to open.

With the stepping switch in position #2, deck III thereof energizes solenoid 2CR which in turn operates switch 2CR1 to closed position thereby energizing solenoid SL5. Energization of solenoid SL5 opens valve 298 so as to supply fluid pressure to the upper end of the major motion cylinder 162 thereby causing piston rods 164 and 168, cylinder 166, head support plate 135, bracket 136, head 144, masks 236' and 232', and the articles to be coated within the masks all to be moved downwardly as a unit so that the masks and article are submerged within the fluidized bed of powder 348 as illustrated in FIGURE 7. Piston rod 164 continues to move downwardly until cam 464 shown in FIGURE 2 operates the toggle of switch LS1 to a closed position thereby supplying current to the terminal #2 of deck II of switch STS so as to energize its stepping coil and causing it to be stepped to position #3, thereby deenergizing solenoid SL2 and ending down motion of piston rod 164 and head 144. When switch STS steps to position #3, bottom trip switch LS1 is still closed thereby energizing solenoid 11CR by line 45, and this solenoid in turn closes switch 11CR1 which in turn applies power through line 44 to a Bellows transformer which energizes solenoid SL7. The stepping of switch STS to position #3 also energizes solenoid 3CR thereby closing switch 3CR2 which energizes and starts down timer #1 which determines the length of time head 144 remains in the down position. When solenoid SL7 is energized, fluid pressure is supplied to the minor motion cylinder 166 by conduit 336 and by means explained above, fluid pressure is alternately admitted to and exhausted from opposite ends of the cylinder 166 thereby causing it to reciprocate up and down through a relatively short stroke relative to piston rods 168 and 164. This causes support plate 135, head 144 and the masks 232' and 236' to be reciprocated through a minor motion up and down within the fluidized bed of powder thereby causing the powder to flow freely through the ends of mask 232' and slots 398 of rotor cylinder 390 thereby thoroughly coating the unmasked surfaces of the rotor with fluidized powder which is fused to the surfaces by the heat of the rotor. The duration of the minor motion is determined by down timer #1 which eventually closes switch 1TR thereby applying power to the stepping coil of switch STS and causing it to step to position #4.

In position #4, deck IV of switch STS energizes relay 4CR which in turn closes switch 4CR1 thereby energizing solenoid SL6 through line 47. Energization of solenoid SL6 operates valve 298 so as to supply fluid pressure to the lower end of major motion cylinder 162 by conduit 302 and exhaust the upper end of the cylinder by conduits 300 and 244. This causes piston rod 164 to move upwardly which in turn moves cam 464 of FIGURE 2 upwardly. As the cam 464 moves upwardly from switch LS1, its toggle 466 is released thereby permitting the switch to automatically open which in turn causes solenoid 11CR to become de-energized so as to open switch 11CR1 thereby de-energizing solenoid SL7 to terminate minor motion of cylinder 166. After piston rod 164 has moved upwardly to a mid position, cam 464 contacts the toggle of middle trip switch LS2 so as to close this switch. The closing of switch LS2 energizes the stepping coil of stepping switch STS thereby causing it to be be stepped to position #5 whereby deck IV of the stepping switch energizes relay 5CR which in turn closes switch 5CR1 which in turn starts the center timer through line 48. At the same time, relay 5CR closes switch 5CR2 so as to apply power to solenoid SL9 through line 56. Energization of solenoid SL9 operates valve 316 so as to supply fluid pressure through conduit 322 to the bottom of flip flop cylinder 172 thereby moving piston rod 178 and ratchet 182 so as to rotate gear 202, shaft 192 and the masks 180° as illustrated in FIGURE 8. When timer 3TR runs out, its switch 3TR connected to terminal #5 of deck II energizes the stepping coil thereby causing the switch STS to be stepped to position #6. Deck IV by line 28 then energizes relay 2CR which in turn closes switch 2CR1 thereby energizing solenoid SL5 so as to operate valve 298 to supply fluid pressure to the upper end of major motion cylinder 162 and exhaust the lower end of the cylinder thereby causing head 144 to again be moved downwardly within the fluidized bed 348 while the masks and rotor 388 are inverted. Down motion continues until cam 464 closes trip switch LS1 thereby causing switch STS to be stepped to position #7. Since trip switch LS1 is closed, relay 11CR is again energized by line 45 so as to close switch 11CR1 thereby energizing solenoid SL7 so as to again cause minor motion whereby the minor motion cylinder 166 reciprocates the masks 236' and 232' up and down in the fluidized bed. By reciprocating the rotor 388 in the inverted position up and down in the fluidized bed, a more thorough and uniform coating of fusible powder is applied to its unmasked surfaces. When switch STS moves to position #7 relay 7CR is energized by deck IV and line 35 thereby closing switch 7CR2 so as to energize down timer #2. When down timer #2 runs out its switch 2TR closes thereby stepping switch STS to position #8.

With the stepped switch in position #8, its deck III energizes relay 4CR by line 31 thereby closing switch 4CR1 so as to energize solenoid SL6 which opens valve 298 to as to supply fluid pressure to the bottom of major motion cylinder 162. This causes piston rod 164 and head 144 to move upwardly. As soon as this up motion starts, trip switch LS1 automatically opens thereby de-energizing relay 11CR and solenoid SL7 so as to stop minor motion. Up motion of piston rod 164 along with cam 464 and head 144 secured thereto continues until the cam trips switch LS2 thereby stepping switch STS to position #9.

In position #9, deck III of switch STS energizes relay 9CR by lines 32 and 33. This relay then closes switch 9CR1 thereby starting multiflex timer 2. Multiflex timer 2 alternately closes and opens switches MT2-1 and MT2-2 so as to alternately energize and de-energize solenoids SL8 and SL9. By reference to FIGURE 9, it can be seen that this causes valve 316 to be operated so as to alternately supply fluid pressure to opposite ends of the flip flop cylinder 172 thereby causing ratchet 180 to be reciprocated up and down so as to oscillate gear 202 and the masks 236' and 232' secured thereto. The oscillation of the masks and the article to be coated therein causes loose powder to be propelled by centrifugal force from the masks and the rotor 388 therein. However, a fused coating of powder remains on the unmasked surfaces of the rotor as illustrated in FIGURE 23. After a predetermined length of time, multiflex timer 2 closes switch MT2-3 thereby stepping switch STS to position #10. In position #10, deck III of switch STS energizes relay 4CR by line 31. Relay 4CR then closes switch 4CR1 so as to energize solenoid SL6 which opens valve 298 so as to supply fluid pressure to the bottom of the major motion cylinder 162 thereby causing piston rod 164 to be moved upwardly above its central or middle position. Rod 164 moves upwardly until the masks 232' and 236' are moved completely out of and above tank 82. Cam 464 then contacts the toggle of upper limit switch LS3 so as to actuate this switch thereby causing the interrupter of step switch STS to reset the step switch to position #0. Deck III of switch STS then energizes relay 0CR which closes switches 0CR2, 0CR3 and 0CR4. Closure of switch 0CR2 energizes multiflex timer 1, and this timer then first closes switch MT1-1 so as to energize solenoid SL3, and afterwards closes switch MT1-2 so as to energize solenoid SL4. By reference to FIGURE 9 it can be seen that energization of solenoid SL3 supplies fluid pressure by lines 308 and 310 to the bottom ends of cylinders 232 so as to cause masks 236' to be lifted upwardly from the shaft 392 of rotor 388. Energization of solenoid SL4 supplies fluid pressure to the outer ends of lift arm cylinders 224 so as to pivot the masks 232' to the dotted line position illustrated in FIGURE 18 whereupon the rotors 388 may be easily removed. After removal, the rotors may then be further heated, as for example in an oven, to more thoroughly fuse and cure the fused powder adhering thereto. When the multiflex timer 1 runs out, the coating apparatus is cut off and the cycle is completed.

Various switches have been incorporated in the circuit to modify the operations occurring during the cycle of the coating apparatus. Push button PB1 may be manually operated when desired to selectively step switch STS to eliminate or by-pass certain predetermined steps.

Each time PB1 is depressed, stepping switch STS is indexed or advanced one position.

When selector switch SS2 is in the down position as shown in FIGURE 10, it permits a complete coating cycle as explained above. However, when switch SS2 is moved to the up position, the step switch STS will be pulsed automatically from position #3 to position #8 by current flowing from deck I to deck II through line 79.

Closure of switch SS4 supplies current from deck I to the stepping coil of deck II through line 79 when the stepping switch reaches position #7 thereby causing the stepping switch to pulse to position #10 so as to eliminate the steps or operations occurring at positions #8 and #9.

By opening minor motion selector switch SS3, minor motion caused by minor motion cylinder 166 can be selectively stopped or terminated at any time.

By opening flip-flop control switch SS5, the flip-flop operation caused by fluid pressure cylinder 172 may be selectively stopped or terminated at any time.

As illustrated in FIGURE 9, a pair of check valves V are connected in series with the lines connecting each fluid pressure operated cylinder to its solenoid operated control valve. Each check valve V is fully open when fluid pressure is flowing therethrough towards the cylinder to which it is connected. However, the check valve partially closes when exhaust fluid is flowing therethrough from the cylinder to which it is connected so as to function as a restriction to the exhaust flow thereby determining the relative speed between the cylinder and its piston. Each of the valves V is preferably also provided with adjustable means whereby its restrictive capacity may be selectively varied. The relative speed between each fluid pressure cylinder and its piston may also be selectively controlled by the pressure control valves 345.

FIGURES 4 and 5 illustrate how the masks 232 and 236 function to clamp and mask stator 244. First, the closing cylinders 224 are energized with fluid pressure so as to pivot bell crank arms 216 and the upper masks 236 to a substantially horizontal position so that the upper mask is parallel to the lower mask, and then the clamping cylinders 238 are energized with fluid pressure so as to force the upper mask into mating relationship with the lower mask so as to fully clamp and mask the stator 244.

The coating apparatus 80 may be used to coat a variety of electrical parts, or even to coat non-electrical parts with selected fusible powders, or even liquids.

Although the coating apparatus 80 has been illustrated with means for coating two separate articles at one time, it is to be understood that the number of the sets of clamps or masks used on a single machine may be varied as desired so that one article or any number of articles may be simultaneously coated.

Inasmuch as various changes may be made in the form, location and relative arrangement of the several parts without departing from the essential characteristics of the invention, it will be understood that the invention is not to be limited except by the scope of the appended claims.

We claim:

1. A coating apparatus comprising an open topped fluidization receptacle adapted to contain and fluidize a quantity of heat-fusible coating powder, holding means above said receptacle adapted to hold an article to be coated, major power means and minor power means connected to said holding means, automatic control means connected to and controlling said major and minor power means so as to automatically cause said major power means to move said holding means downwardly into said receptacle for a predetermined length of time, to cause said minor power means to move said holding means a relatively short distance up and down in the powder in said receptacle for a predetermined length of time and then cause said major power means to move said holding means upwardly in said receptacle above the powder therein, flip-flop power means connected to said holding means adapted to oscillate said holding means substantially 180°, said control means connected to said flip-flop power means so as to cause said flip-flop means to oscillate said holding means 180° after said major power means has moved said holding means upwardly above said powder, said control means adapted to then energize said major power means so as to cause it to move said holding means downwardly into the powder in said receptacle, to again energize said minor power means to cause it to move said holding means up and down in said powder, then to again energize said major power means to cause it to move said holding means upwardly out of said powder, and to again energize said flip-flop power means to cause it to oscillate said holding means back and forth so as to centrifugally propel excess powder from said holding means and article.

2. Apparatus as defined in claim 1, wherein each of said power means includes a fluid pressure operated motor and solenoid operated valve means connected to each of said fluid pressure operated motors and adapted to selectively connect said motors to a source of fluid pressure, and an electrical circuit connected to said solenoid operated valve means adapted to operate said valve means so as to selectively energize said fluid pressure operated motors in a predetermined sequence.

3. Apparatus as defined in claim 2, wherein said electric circuit includes a multiple position step switch having a stepping coil for stepping the step switch to different positions, connecting means operatively connecting said step switch to said solenoid operated valve means and a plurality of limit switches operated by movement of said holding means connected to said stepping coil.

4. Apparatus as defined in claim 3, wherein said connecting means comprises a plurality of relay switches and a plurality of timers controlled by said stepping switch, some of said relay switches operated by said step switch and other of said relay switches operated by said timers, and a plurality of switches connected to said stepping coil operated by said timers.

5. Apparatus as defined in claim 4, including a manually operated switch connected to said stepping coil whereby said step switch may be manually stepped to different positions.

6. Apparatus for the fluidized bed coating of various substrates comprising:
   (a) a fluidized bed coating tank adapted to contain a bed of finely divided fluidized coating materials;
   (b) an operating platform mounted for reciprocating vertical motion superjacent said fluidized bed container;
   (c) a first fluid operated piston functionally contained within a first cylinder, which first cylinder is fixedly positioned with respect to said fluidized bed container;
   (d) a second fluid operated piston functionally contained within a second cylinder, which second cylinder is fixedly positioned with respect to said operating platform;
   (e) a rigid piston rod operatively connecting said first and said second fluid operated pistons;
   (f) controlled valve means adapted to introduce fluids under pressure into said first and said second cylinders;
   (g) at least one work holder mounted upon said operating platform adapted to hold and support a substrate, said holding device including a first fluid actuated motor adapted to cause said holding device to move into and out of engagement with a substrate, and a second fluid motor adapted to rotate said holding device through an arc of about 180° in a vertical plane; and
   (h) said first piston adjusted so that in its extended position it will cause said holding device to be positioned above the fluidized bed of coating materials, and so that in its retracted position it will cause said holding device to be positioned within said fluidized bed of coating materials.

7. Apparatus according to claim 6 in which said controlled valve means associated with said second fluid operated piston are adapted to cause said piston to reciprocate when said first piston is in its retracted position.

8. Apparatus according to claim 7 including control means to cause said holding device to rotate back and forth through an arc of about 180° for a period of time after said holding device is withdrawn from said fluidized bed of coating materials.

9. Apparatus according to claim 8 in which said holding device contains internal passageways for directing a stream of air against selected portions of the substrate to prevent said fluidized coating materials from contacting such selected areas.

References Cited
UNITED STATES PATENTS

| | | | |
|---|---|---|---|
| 1,656,977 | 1/1928 | Henry | 118—425 X |
| 2,235,445 | 3/1941 | Beal | 118—425 X |
| 2,824,029 | 2/1958 | Zinty. | |
| 3,136,650 | 6/1964 | Avila | 117—21 |
| 3,247,004 | 4/1966 | Dosser | 117—18 |
| 3,261,707 | 7/1966 | Korski et al. | 118—429 X |
| 3,262,420 | 7/1966 | Bossi et al. | 118—423 X |

WALTER A. SCHEEL, *Primary Examiner.*

JOHN P. McINTOSH, *Assistant Examiner.*

U.S. Cl. X.R.

118—56, 406, 425